United States Patent [19]

Yahagi

[11] Patent Number: 5,619,551
[45] Date of Patent: Apr. 8, 1997

[54] CELLULAR TELEPHONE EXCHANGE SYSTEM WHICH ALLOWS SETTING OF CONNECTIONS BETWEEN THE BASE STATION TRANSMITTER-RECEIVERS AND BASE STATION CONTROLLERS BASE ON MOVEMENT OF THE MOBILE STATION

[75] Inventor: Masahiko Yahagi, Tokyo, Japan

[73] Assignee: NEC Corporation, Tokyo, Japan

[21] Appl. No.: 265,713

[22] Filed: Jun. 27, 1994

Related U.S. Application Data

[63] Continuation-in-part of Ser. No. 950,275, Sep. 24, 1992, abandoned.

[30] Foreign Application Priority Data

Sep. 26, 1991 [JP] Japan ................................. 3-273620

[51] Int. Cl.⁶ ........................................... H04Q 7/22
[52] U.S. Cl. ......................... 379/60; 455/33.2; 455/33.3; 379/58
[58] Field of Search ........................ 370/60, 94.1, 95.1; 379/58, 59, 60, 63; 455/33.3, 54.1, 33.2

[56] References Cited

U.S. PATENT DOCUMENTS

| | | | |
|---|---|---|---|
| 3,539,924 | 11/1970 | Daskalakis et al. | 325/51 |
| 3,906,166 | 9/1975 | Cooper et al. | 179/41 A |
| 4,398,063 | 8/1983 | Hass et al. | 379/60 |
| 4,712,229 | 12/1987 | Nakamura | 379/58 |
| 4,829,554 | 5/1989 | Barnes et al. | 379/58 |
| 4,833,702 | 5/1989 | Shitara et al. | 379/60 |
| 4,955,082 | 9/1990 | Hattori et al. | 455/33.3 |
| 5,095,531 | 3/1992 | Ito | 455/33 |
| 5,195,090 | 3/1993 | Bolliger et al. | 370/94.1 |
| 5,210,753 | 5/1993 | Natarajan | 370/95.1 |
| 5,260,987 | 11/1993 | Mauger | 379/58 |
| 5,422,933 | 6/1995 | Barnett et al. | 379/60 |
| 5,422,935 | 6/1995 | Spear | 379/63 |
| 5,491,834 | 2/1996 | Chia | 455/33.2 |
| 5,513,380 | 4/1996 | Ivanov | 455/33.2 |

FOREIGN PATENT DOCUMENTS

| | | | |
|---|---|---|---|
| 3921637 | 1/1991 | Germany | 379/59 |
| 3289898 | 12/1991 | Japan | 379/59 |
| 2237478 | 5/1991 | United Kingdom | 379/59 |

OTHER PUBLICATIONS

Patent Abstracts of Japan, vol. 13, No. 268 (E–775) 20 Jun. 1989.

"Cellular Intersystem Handoff: Creating Transparent Boundaries" 36th IEEE Vehicular Technology Conference, Dallas, USA, pp. 304–310, 22 May 1986.

Primary Examiner—William Cumming
Attorney, Agent, or Firm—Foley & Lardner

[57] ABSTRACT

A cellular mobile telephone exchange system comprises a switch which allows optional setting of the connecting conditions between a plurality of radio base-station transmitter-receivers and a plurality of base-station controllers.

2 Claims, 6 Drawing Sheets

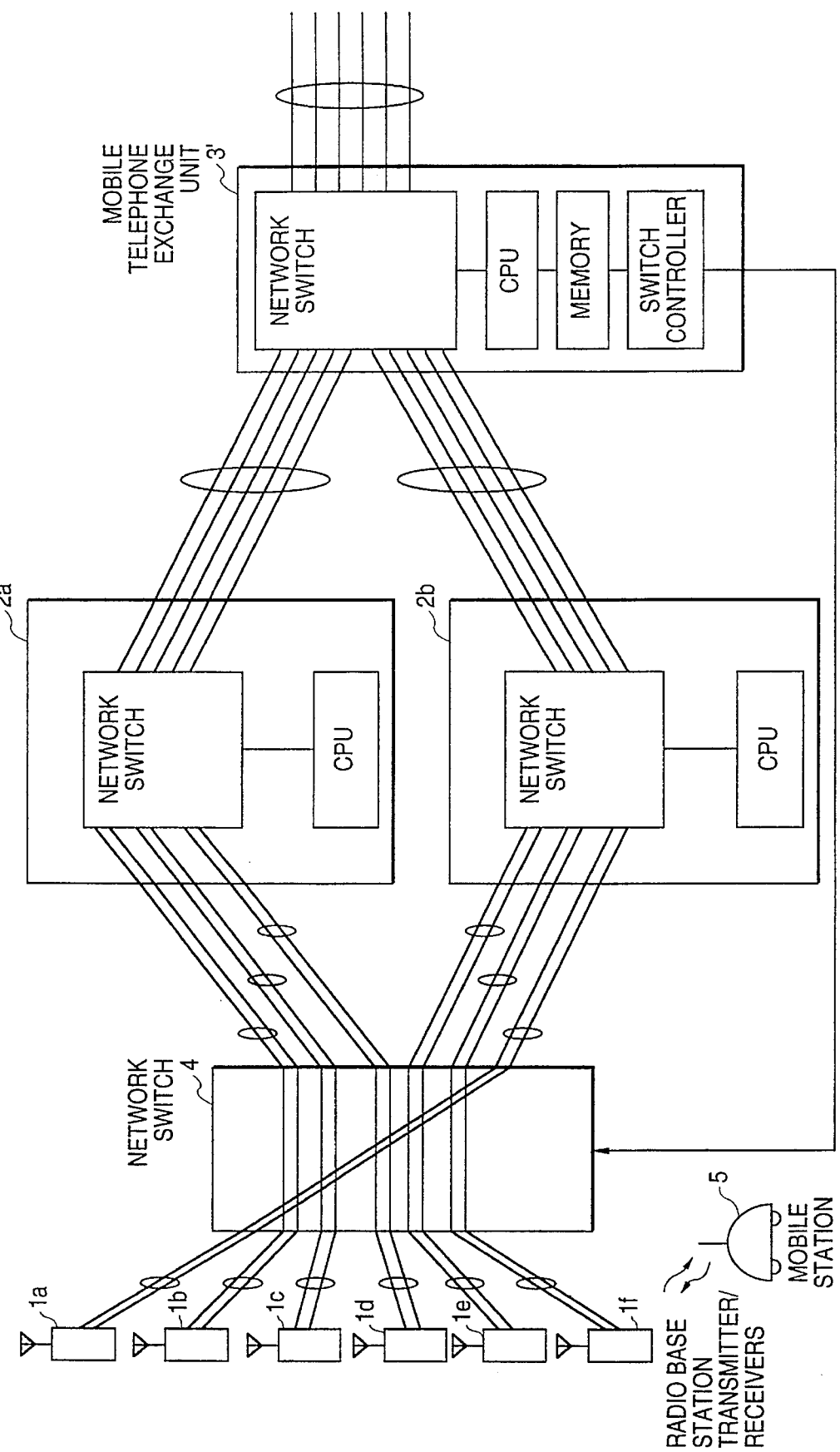

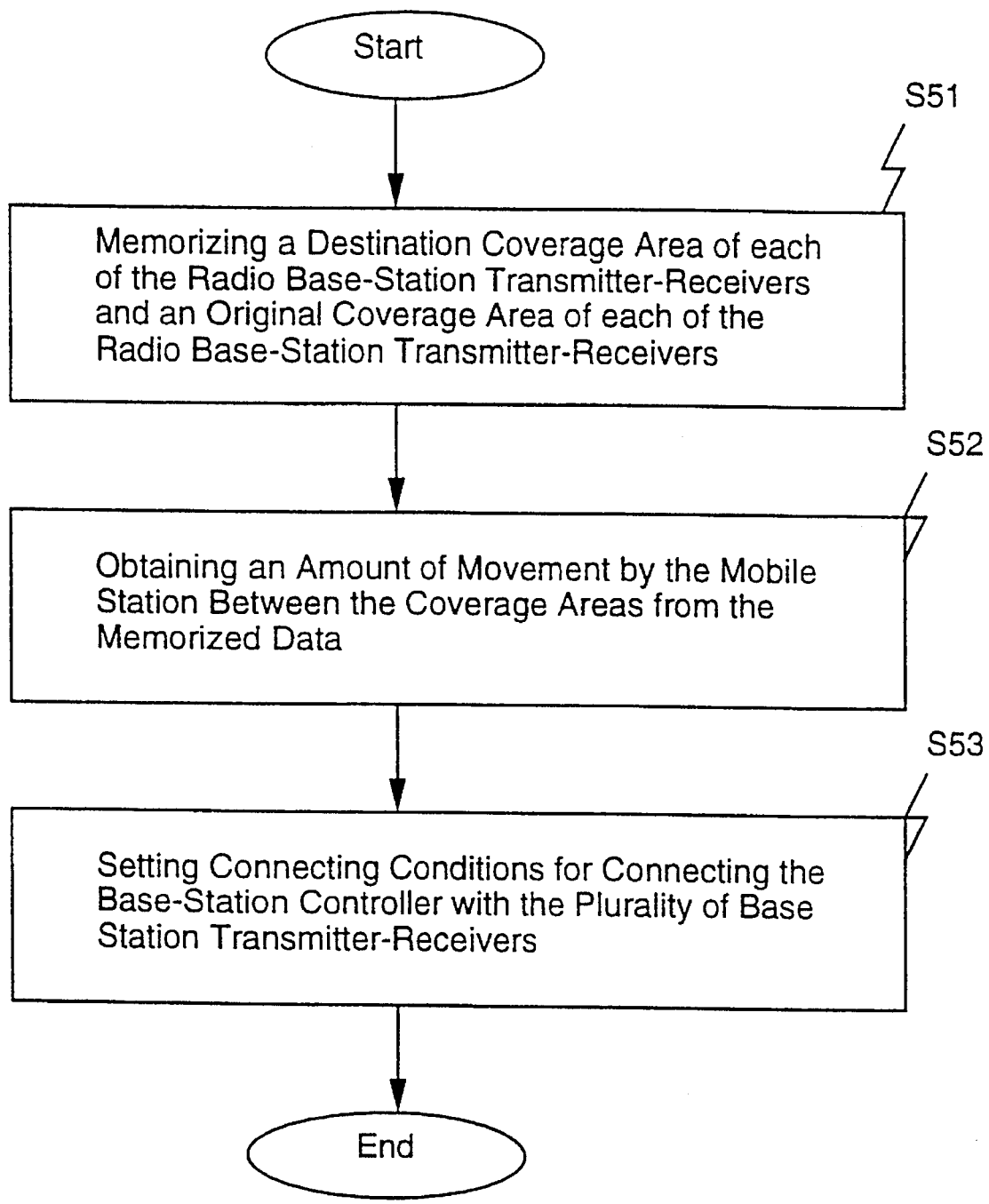

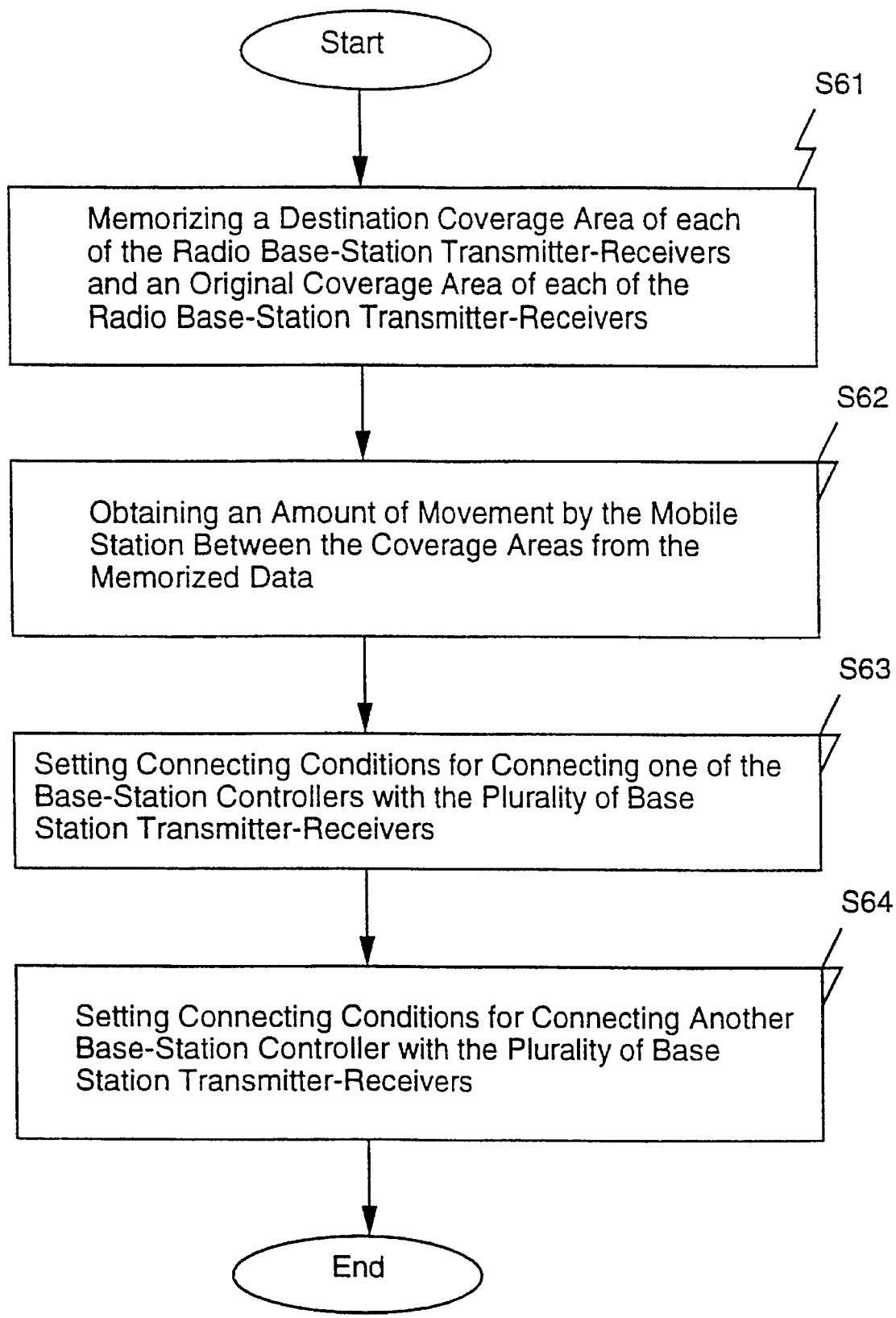

CELLULAR TELEPHONE EXCHANGE SYSTEM WHICH ALLOWS SETTING OF CONNECTIONS BETWEEN THE BASE STATION TRANSMITTER-RECEIVERS AND BASE STATION CONTROLLERS BASE ON MOVEMENT OF THE MOBILE STATION

CROSS REFERENCE

This is a Continuation-In-Part application for U.S. patent application Ser. No. 07/950,275 filed Sep. 24, 1992, now abandoned.

BACKGROUND OF THE INVENTION

1. Field of the Invention

The present invention relates to a cellular mobile telephone exchange system comprising one or more mobile stations, a plurality of groups of radio base-station transmitter-receivers, base-station controllers assigned to each group of radio base-station transmitter-receivers for controlling each radio base-station transmitter-receiver in said group, and a mobile telephone switching unit for controlling a plurality of base-station controllers.

2. Description of the Prior Art

FIG. 1 is a block diagram showing a cellular mobile telephone exchange system of the conventional type. FIG. 2 is a diagram showing the coverage areas of each radio base-station transmitter-receiver 1a through 1f. Each transmitter-receiver 1a through 1f has a transmitting-receiving function for a plurality of channels and covers one area as shown in FIG. 2. Base-station controller 2a comprises communication channels communicating with a mobile telephone exchange unit 3 and radio base-station transmitter-receivers 1a, 1b and 1c, a network switch which connects these channels to each other, and a CPU for controlling the network switch. Similarly, base-station controller 2b comprises communication channels communicating with mobile telephone exchange unit 3 and radio base-station transmitter-receivers 1d, 1e and 1f, a network switch which connects these channels to each other, and a CPU for controlling the network switch.

When mobile station 5 moves out of the range of radio base-station transmitter-receiver 1b and into the coverage area of radio base-station transmitter-receiver 1c, base-station controller 2a switches the communication channel from the radio base-station transmitter-receiver 1b to 1c by using its network switch and CPU to continue the call with mobile station 5. Next, when mobile station 5 moves out of the coverage area of radio base-station transmitter-receiver 1c and into the coverage area of radio base-station transmitter-receiver 1d, base-station controller 2a becomes unable to keep up with the movement of the mobile station by a switching operation within the controller, and consequently, base-station controllers 2a, 2b and mobile telephone exchange unit 3 exchange information to connect the appropriate call channel by using the network switch of the mobile telephone exchange unit 3, thereby continuing the call with mobile station 5.

The conventional cellular mobile telephone exchange system described above has the drawback that when a mobile station frequenting moves between the coverage area of a radio base-station controlled by a base-station controller and the coverage area of another radio base-station controlled by another base-station controller according to a schedule set for more than one time zone, or when traffic increases between the coverage areas of more than one base-station controller (movement characteristics of a mobile station), the load on the mobile telephone exchange unit will increase to an excessive degree.

SUMMARY OF THE INVENTION

It is an object of the present invention to provide a cellular mobile telephone exchange system in which the load on the mobile telephone exchange unit is reduced and the time period required for switching call channels is shortened.

In accordance with the present invention, a cellular mobile telephone exchange system comprises one or more mobile stations, a plurality of radio base-station transmitter-receivers, a plurality of base-station controllers for controlling said radio base-station transmitter-receivers, a switch which allows optional setting of connecting conditions between a plurality of said radio base-station transmitter-receivers and a plurality of said base-station controllers, and a mobile telephone exchange unit for controlling a plurality of said base-station controllers.

In conventional systems, in which the connection between a base-station transmitter-receiver is nearly always fixed, the call channel exchange control is in many cases performed by a plurality of base-station controllers and a mobile telephone switching unit; however, by changing the connecting conditions between the base-station controllers and the radio base-stations by using a switch as in the present invention, it becomes possible to perform call channel switching control within the base-station controller. Consequently, call handling loads on a mobile telephone exchange unit can be reduced and the time necessary for exchanging a call channel is shortened.

Other features and advantages of the invention will be apparent from the following description taken in connection with the accompanying drawings.

BRIEF DESCRIPTION OF THE DRAWINGS

FIG. 4 is a block diagram showing a state of inner connection of network switch 4 different from that shown in FIG. 3, FIG. 5 is a block diagram of steps of a cellular mobile telephone exchange method of the present invention; and FIG. 6 is a block diagram of steps of a cellular mobile telephone exchange method of the present invention.

DETAILED DESCRIPTION OF THE PREFERRED EMBODIMENTS

Figure 1:
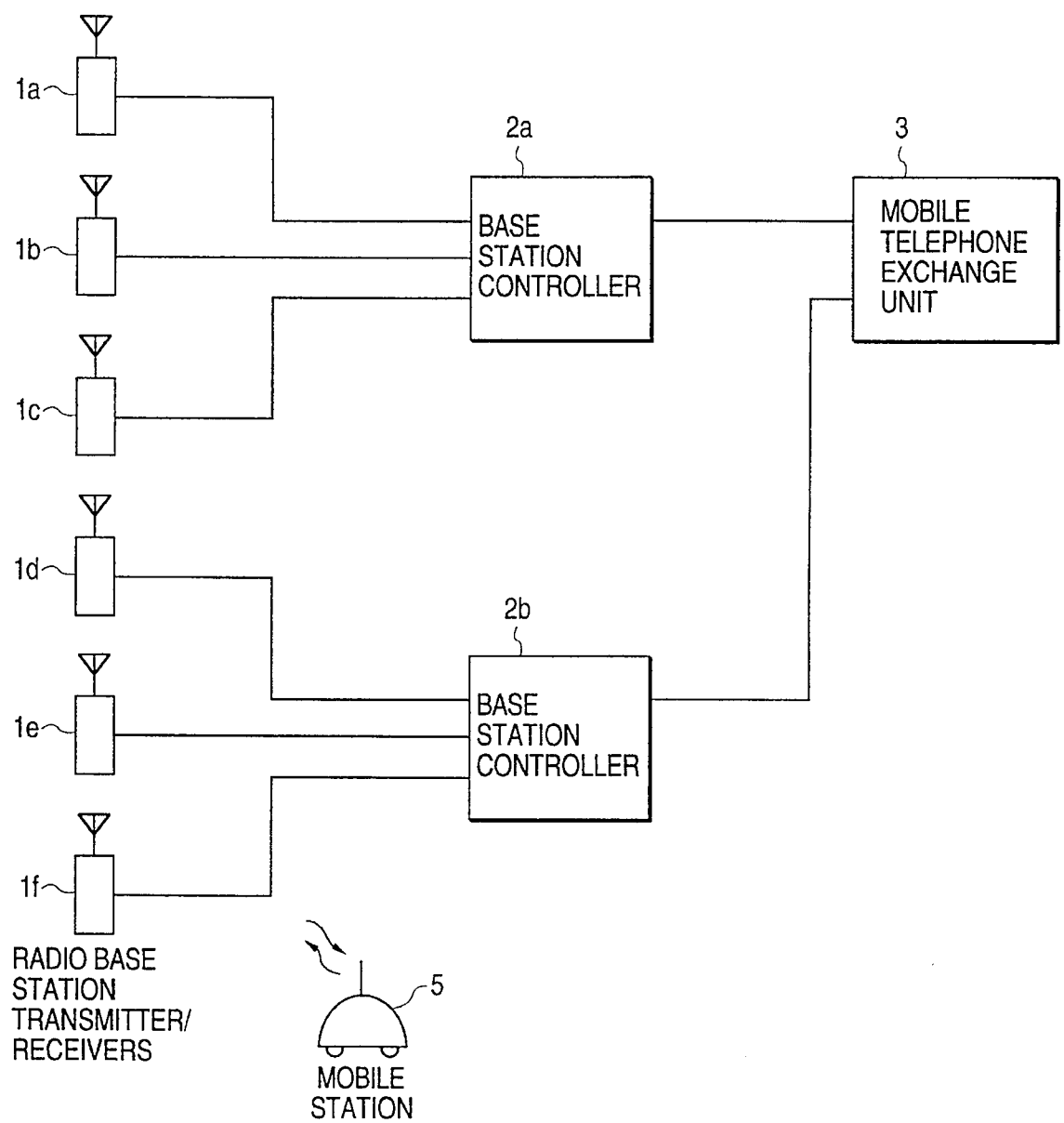
FIG. 1 is a block diagram of an example of a conventional cellular mobile telephone exchange system.
Figure 2:
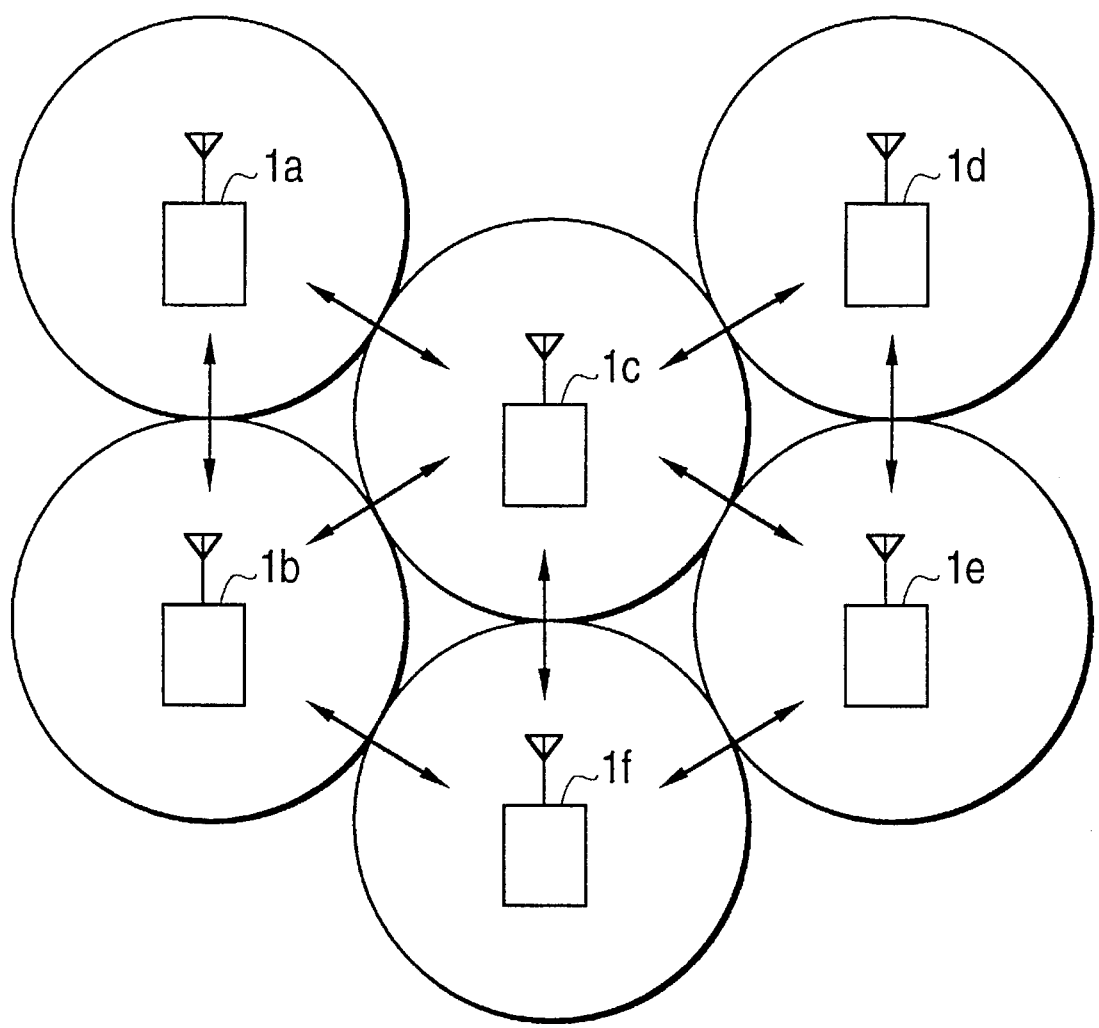
FIG. 2 is a diagram showing the coverage areas of each radio base-station transmitter-receiver 1a through 1f.
Figure 3:
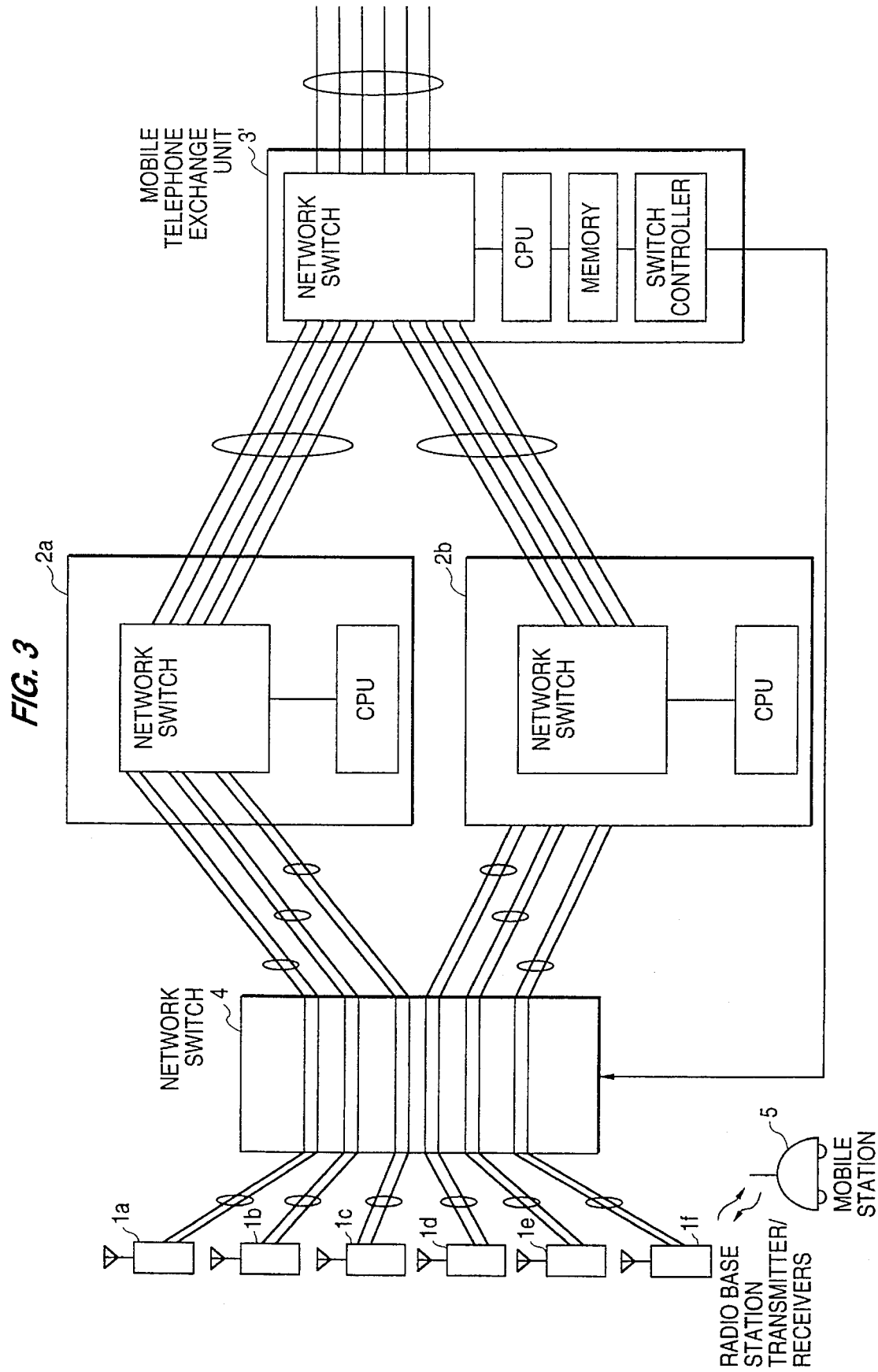
FIG. 3 is a block diagram showing an embodiment of the cellular mobile telephone exchange system of the present invention.

Referring to FIG. 3, the cellular mobile telephone switching system according to the present invention includes (1) radio base-station transmitter-receivers 1a through 1f, (2) base-station controller 2a for controlling radio base-station transmitter-receivers 1a through 1f, (3) base-station controller 2b for controlling radio base-station transmitter-receivers 1a through 1f, (4) network switch 4 for connecting radio base-stations 1a through 1f and base-station controllers 2a and 2b, (5) mobile telephone exchange unit 3' for controlling base-station controllers 2a, 2b, and (6) mobile station 5.

Network switch 4, which has the same number of input lines and output lines, is controlled by mobile telephone exchange unit 3' so that it can connect radio base-station transmitter-receivers 1a through 1c to radio base-station controller 2a or 2b and connect radio base-station transmitter-receivers 1d through 1f to radio base-station controller 2b or 2a.

The operation of the embodiment will now be described hereinafter. Let it be assumed that base-station controller 2a is connected to radio base-station transmitter-receivers 1a, 1b and 1c, and base-station controller 2b is connected to radio base-station transmitter-receivers 1d, 1e and 1f, both by means of network switch 4. At this time, base-station controller 2a can connect the call channels of radio base-station transmitter-receivers 1a, 1b and 1c to mobile telephone exchange unit 3'. Similarly, base-station controller 2b can connect the call channels of radio base-station transmitter-receivers 1d, 1e and 1f to mobile telephone exchange unit 3'.

When mobile station 5 moves from the coverage area of radio base-station transmitter-receiver 1b to the coverage area of radio base-station transmitter-receiver 1c, a call to mobile station 5 can be continued by switching the network switch of base-station controller 2a.

Mobile telephone exchange unit 3' observes the amount of movement by mobile station 5 between the coverage areas for different time zones by using its traffic condition observation function. In order to minimize the load on mobile telephone exchange unit 3', mobile telephone exchange unit 3' then switches the connecting condition of network switch 4 to that shown in FIG. 4, using the observed data. In FIG. 4, since both radio base-station transmitter-receiver 1c and radio base-station transmitter-receiver 1d can be connected by base-station controller 4a, a call to mobile station 5 can be continued by switching only the network switch of base-station controller 2a. Therefore, it is possible to continue the call with mobile station 5 without using the network switch of mobile telephone exchange unit 3', thereby reducing the load on the mobile telephone exchange unit 3'.

As stated above, in this embodiment, a call to mobile station 5 can be continued not only by switching the network switch of base-station controller 2a but also by switching the network switch of base-station controller 2b and the network switch of mobile telephone exchange unit 3'.

Further, a connection bus having a switching function similar to network switch 4 can be used instead of network switch 4.

The calling state of mobile station 5 must be maintained as mobile station 5 moves between coverage areas of the radio base-station transmitters-receivers 1a–1f. For this purpose, the mobile telephone exchange unit 3' switches the communication link of mobile station 5 for the coverage area it was previously in (i.e., the original coverage area); to the communication link for the destination coverage area to which mobile station 5 has moved. This is called a "hand-off process." At this time, the mobile telephone exchange unit 3' memorizes the coverage areas to which the communication link of mobile station 5 is set before and after the hand-off process. A large amount of such data are collected and stored and serve to predict statistically the frequency of movement of mobile station 5 in a certain period of time from one coverage area to another coverage area.

Since a base-station controller connected with a coverage area after a hand-off process is not identical to a base-station controller connected with a coverage area before the hand-off process, the communication link between a radio base-station controller and the mobile telephone exchange unit 3' of mobile station 5 must be switched, with the result that the load for this process is applied to the mobile telephone exchange unit 3'. Therefore, the connecting condition of the network switch 4 is set to satisfy connection relationships between the coverage areas and the base-station controllers so as to reduce the load on the mobile telephone exchange unit 3'. In other words, when a plurality of coverage areas correspond to different base-station controllers, coverage areas where mobile station 5 frequently enters and exits are connected with one and the same base-station controller, and coverage areas where mobile station 5 infrequently enters and exits are connected with different base-station controllers. Said in another way, the radio base station transmitter-receivers that have a large amount of movement by a mobile station in and out of their corresponding coverage areas are connected with one and the same base-station controller, and the radio base station transmitter-receivers that have a small amount of movement by a mobile station in and out of their corresponding coverage areas are connected with different base-station controllers.

FIG. 5 shows a flow chart of the steps in a cellular mobile exchange method of the present invention, in which a base-station controller is connected with a plurality of radio base-station transmitter-receivers. In step 51, when a mobile station moves between coverage areas, a destination coverage area of each of the radio base-station transmitter-receivers is memorized, and an original coverage area of each of the radio base-station transmitter-receivers is also memorized. In step 52, an amount of movement by the mobile station between the coverage areas is obtained from the memorized data in the step 51. In step 53, connecting conditions are set for connecting the base-station controller with the plurality of base-station transmitter-receivers so that radio base-station transmitter-receivers having coverage areas with a large amount of movement therein are connected with the base-station controller.

FIG. 6 shows a flow chart of the steps in another cellular mobile exchange method of the present invention, in which a plurality of base-station controllers are connected with a plurality of radio base-station transmitter-receivers. In step 61, when a mobile station moves between coverage areas, a destination coverage area of each of the radio base-station transmitter-receivers is memorized, and an original coverage area of each of the radio base-station transmitter-receivers is also memorized. In step 62, an amount of movement by the mobile station between the coverage areas is obtained from the memorized data in the step 61. In step 63, connecting conditions are set for connecting one base-station controller with the plurality of base-station transmitter-receivers so that radio base-station transmitter-receivers having coverage areas with a large amount of movement therein are connected with the one base-station controller. In step 64, connecting conditions are set for connecting another base-station controller with the plurality of base-station transmitter-receivers so that radio base-station transmitter-receivers having coverage areas with a small amount of movement therein are connected with the another base-station controller.

Although a certain preferred embodiment of the present invention has been shown and described in detail, it should be understood that various changes and modifications may be made therein without departing from the scope of the appended claims.

What is claimed is:

1. A cellular telephone exchange system comprising:

one or more mobile stations, a plurality of radio base-station transmitter-receivers, a plurality of base-station controllers for controlling said radio base-station transmitter-receivers, a switch which allows setting of connecting conditions between said plurality of radio base-station transmitter-receivers and said plurality of base-station controllers, and a mobile station exchange unit for controlling said plurality of base-station controllers, wherein said switch is controlled by said mobile telephone exchange unit, wherein said mobile telephone exchange unit assigns said plurality of radio base-station transmitter-receivers to said plurality of base-station controllers based on an amount of movement of said mobile station among a plurality of coverage areas corresponding to said plurality of radio base-station transmitter-receivers, and wherein radio base-station transmitter-receivers having a large amount of movement by said mobile station in and out of said coverage areas corresponding to said radio base-station transmitter-receivers are assigned to one of said plurality of base-station controllers, and radio base-station transmitter-receivers having a small amount of movement in and out of said coverage areas corresponding to said radio base-station transmitter-receivers are assigned to another of said plurality of base-station controllers.

2. A cellular telephone exchange system according to claim 1, wherein said plurality of base station controllers are arranged in parallel with respect to each other.

* * * * *